US010819434B1

(12) United States Patent
Rahman

(10) Patent No.: US 10,819,434 B1
(45) Date of Patent: Oct. 27, 2020

(54) HYBRID FIBER COAXIAL FED 5G SMALL CELL SURVEILLANCE WITH HYBRID FIBER COAXIAL HOSTED MOBILE EDGE COMPUTING

(71) Applicant: AT&T Intellectual Property I, L.P., Atlanta, GA (US)

(72) Inventor: Moshiur Rahman, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/380,403

(22) Filed: Apr. 10, 2019

(51) Int. Cl.
| | | |
|---|---|---|
| H04B 10/27 | (2013.01) | |
| H04B 10/2575 | (2013.01) | |
| H04L 12/24 | (2006.01) | |
| H04L 29/08 | (2006.01) | |

(52) U.S. Cl.
CPC ....... H04B 10/25752 (2013.01); H04B 10/27 (2013.01); H04L 41/5003 (2013.01); H04L 67/10 (2013.01)

(58) Field of Classification Search
CPC ..... H04L 43/16; H04L 45/125; H04B 10/116; H04B 10/1149
See application file for complete search history.

(56) References Cited

U.S. PATENT DOCUMENTS

| | | | |
|---|---|---|---|
| 8,671,403 B2 | 3/2014 | Sundarrajan et al. | |
| 8,938,769 B2 | 1/2015 | Rakib | |
| 8,989,024 B2 | 3/2015 | Shaw et al. | |
| 9,229,711 B2 | 1/2016 | Arasaratnam | |
| 9,298,515 B2 | 3/2016 | Mcmurry et al. | |
| 9,547,564 B1 | 1/2017 | Troutman et al. | |
| 9,690,609 B2 | 6/2017 | Lawler | |
| 9,720,724 B2 | 8/2017 | Agrawal et al. | |
| 9,798,571 B1 | 10/2017 | Cao et al. | |
| 9,843,485 B2 | 12/2017 | Desai et al. | |
| 9,906,458 B2 | 2/2018 | Phillips et al. | |

(Continued)

FOREIGN PATENT DOCUMENTS

| | | |
|---|---|---|
| CN | 107948129 A | 4/2018 |
| CN | 109257193 A | 1/2019 |

(Continued)

OTHER PUBLICATIONS

Hayes, "The Intersection of HFC and 5G," © 2017 SCTE-ISBE, 14 pages.

(Continued)

*Primary Examiner* — Dzung D Tran
(74) *Attorney, Agent, or Firm* — Amin, Turocy & Watson, LLP

(57) ABSTRACT

An architecture for surveillance of hybrid fiber coaxial (HFC) 5th generation (5G) Long Term Evolution (LTE) small cell devices using mobile edge computing techniques hosted by a HFC device is disclosed. A method can comprise receiving first data representing a quality of service value associated with a small cell device of a first group of 5G small cell devices; retrieving second data representing a historical quality of service value associated with a second group of 5G small cell devices; as a function of the first data and the second data, generating a change value for the small cell device; and based on the change value, facilitating an adjustment in an operation of the small cell device.

20 Claims, 10 Drawing Sheets

(56) References Cited

U.S. PATENT DOCUMENTS

| | | | |
|---|---|---|---|
| 9,942,104 | B2 | 4/2018 | Flavel et al. |
| 9,952,888 | B2 | 4/2018 | Dowlatkhah et al. |
| 9,996,381 | B1 | 6/2018 | Raju et al. |
| 10,104,548 | B1 | 10/2018 | Dowlatkhah et al. |
| 2013/0268799 | A1 | 10/2013 | Mestery et al. |
| 2014/0362714 | A1 | 12/2014 | Day et al. |
| 2016/0239330 | A1 | 8/2016 | Mc et al. |
| 2016/0359592 | A1 | 12/2016 | Kulshreshtha et al. |
| 2017/0031706 | A1 | 2/2017 | Podvratnik et al. |
| 2017/0048308 | A1 | 2/2017 | Qaisar |
| 2017/0272365 | A1 | 9/2017 | Wei et al. |
| 2017/0295109 | A1 | 10/2017 | Byers et al. |
| 2018/0063020 | A1 | 3/2018 | Bhagavatula et al. |
| 2018/0183855 | A1 | 6/2018 | Sabella et al. |
| 2018/0206133 | A1* | 7/2018 | Venkatraman ........... H04W 4/70 |
| 2018/0270103 | A1 | 9/2018 | Chapman et al. |
| 2018/0270780 | A1 | 9/2018 | Xiong et al. |
| 2018/0302807 | A1 | 10/2018 | Chen et al. |
| 2018/0310292 | A1 | 10/2018 | Yang et al. |
| 2018/0316725 | A1 | 11/2018 | Mani et al. |
| 2018/0321974 | A1 | 11/2018 | Ferris |
| 2018/0337820 | A1 | 11/2018 | Chen et al. |
| 2018/0338017 | A1 | 11/2018 | Mekuria et al. |
| 2018/0359658 | A1 | 12/2018 | Chitrapu |
| 2019/0036869 | A1 | 1/2019 | Jana |
| 2019/0044794 | A1 | 2/2019 | Chew |
| 2019/0124144 | A1 | 4/2019 | Isci et al. |
| 2019/0140933 | A1* | 5/2019 | Guim Bernat ........... H04L 43/16 |
| 2019/0141593 | A1* | 5/2019 | Wei ........................ H04W 76/11 |
| 2019/0182741 | A1* | 6/2019 | Oyman .................. H04M 15/88 |
| 2019/0190950 | A1 | 6/2019 | Senecal et al. |
| 2019/0260651 | A1 | 8/2019 | Raney et al. |
| 2019/0261197 | A1* | 8/2019 | Bellamkonda ........ H04W 24/02 |
| 2019/0313383 | A1* | 10/2019 | Xiong .................. H04W 72/042 |
| 2019/0387539 | A1* | 12/2019 | Finkelstein ........... H04W 72/14 |

FOREIGN PATENT DOCUMENTS

| | | |
|---|---|---|
| IN | 201724036802 A | 10/2018 |
| WO | 2009149416 A1 | 12/2009 |
| WO | 2015184179 A1 | 12/2015 |
| WO | 2017128881 A1 | 8/2017 |
| WO | 2017221481 A1 | 12/2017 |
| WO | 2018009577 A1 | 1/2018 |
| WO | 2018031070 A1 | 2/2018 |
| WO | 2018037549 A1 | 3/2018 |
| WO | 2018089417 A1 | 5/2018 |
| WO | 2018135742 A1 | 7/2018 |
| WO | 2018154355 A1 | 8/2018 |
| WO | 2018215046 A1 | 11/2018 |
| WO | 2019055355 A1 | 3/2019 |

OTHER PUBLICATIONS

Chang, Chia-Yu, et al. "MEC architectural implications for LTE/LTE-A networks." Proceedings of the Workshop on Mobility in the Evolving Internet Architecture, ACM, 2016. http://www.e urecom.fr/fr/publication/4978/download/comsys-publi-4978.pdf.

Parvez, I. et al. "A Survey on Low Latency Towards 5G: RAN, Core Network and Caching Solutions." IEEE Communications Surveys & Tutorials, vol. 20, No. 4, 2018. https://arxiv.org/pdf/1708.02562.pdf.

Chapman, J.T. et al. "Low latency techniques for mobile backhaul over DOCSIS." IEEE Wireless Communications and Networking Conference (WCNC), 2018. https://booksc.xyz/book/70626190/56dd51.

Leddy, Craig, "Cable's 5G Backhaul & Small Cell Prospects & Challenges," Light Reading, heavyreading.com, Oct. 2017. http://www.heavyreading.com/details.asp?s ku_id=3410&skuitem_itemid=1739.

Ai, et al., "Edge computing technologies for Internet of Things: a primer," Digital Communications and Networks 4 (2018), pp. 77-86.

Dolui, et al., "Comparison of Edge Computing Implementations: Fog Computing, Cloudlet and Mobile Edge Computing," 2017 IEEE, 6 pages.

Satyanarayanan, et al., "The Case for VM-based Cloudlets in Mobile Computing," Last Accessed: Aug. 8, 2019, 9 pages.

Notice of Allowance received for U.S. Appl. No. 16/421,944 dated Aug. 21, 2020, 35 pages.

* cited by examiner

HYBRID FIBER COAXIAL FED 5G SMALL CELL SURVEILLANCE WITH HYBRID FIBER COAXIAL HOSTED MOBILE EDGE COMPUTING

TECHNICAL FIELD

The disclosed subject matter provides an architecture for surveillance of hybrid fiber coaxial (HFC) 5th generation (5G) Long Term Evolution (LTE) small cell devices using mobile edge computing techniques hosted by a HFC device.

BACKGROUND

As the 5th generation (5G) Long Term Evolution paradigm comes to fruition, cable operators are expanding their fiber optic networks for macrosites and/or sites that will employ large swaths of bandwidth in the centimeter (cm) and/or millimeter (mm) waveband spectrum, as well as use a hybrid fiber coaxial (HFC) infrastructure to provide power, attachment, and/or connectivity (PAC) for cellular connectivity in legacy cellular radio spectra.

DETAILED DESCRIPTION

Figure 1:
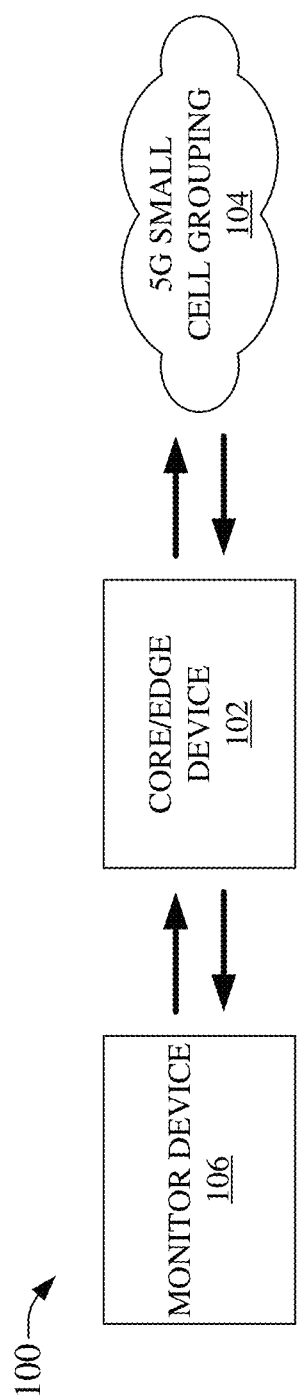
FIG. 1 is an illustration of a system for providing surveillance of hybrid fiber coaxial (HFC) 5th generation (5G) Long Term Evolution (LTE) small cell devices using mobile edge computing techniques hosted by a HFC device, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed architecture leverages HFC provided PAC. With the introduction of HFC fed 5G small cell devices, the disclosed architecture connects HFC-hosted mobile edge computing (MEC) server devices to a core cloud surveillance server to provide all necessary network management services, including monitoring and self-optimizing for the HFC-fed 5G small cell devices. In this regard for mobility networking, MEC aims to place computing and storage resources in the macro (4G/5G) radio access network (RAN) to improve the delivery of content applications to end user devices. As disclosed, MEC residing in a HFC node device (such as a fiber node device) can interface, for example, with a core network central surveillance service assurance server device via a head end (HE) cable modem termination system (CMTS) device and an internet protocol (IP) router device to provide the capability of monitoring the HFC-fed 5G small cell devices to improve user experience and to better handle other latency sensitive services.

The disclosed systems and methods, in accordance with various embodiments, provide a system, apparatus, or device comprising: a processor, and a memory that stores executable instructions that, when executed by the processor, facilitate performance of operations. The operations can comprise retrieving data representing a quality of service value associated with a small cell device of a group of small cell devices configured according to a 5G wireless communication protocol; and as a function of the quality of service value, facilitating adjusting an operating parameter associated with the small cell device.

In accordance with the foregoing, the device, system, or apparatus can be located in a hybrid fiber coaxial infrastructure environment, and the device can execute a mobile edge computing process. The device can be a first device that interfaces with a second device located in a 5G long term evolution network and/or infrastructure environment. The operations can then further comprise sending the quality of service value to the second device and receiving the operation parameter from the second device.

The operation parameter can facilitate a reduction of a transmission power level associated with the small cell device. The operation parameter can also facilitate a change in azimuth associated with an antenna associated with the small cell device.

In accordance with further embodiments, the subject disclosure describes a method and/or process, comprising a series of acts that can include: receiving, by a device comprising a processor, first data representing a quality of service value associated with a small cell device of a first group of 5G small cell devices; retrieving, by the device, second data representing a historical quality of service value associated with a second group of 5G small cell devices; as a function of the first data and the second data, generating, by the device, a operation change parameter value for the small cell device; and based on the operation change parameter value, facilitating, by the device, a change in an operation of the small cell device.

In accordance with the foregoing, the change in the operation of the small cell device comprises adjusting an azimuth value associated with an antenna of the small cell device; and the change in operation of the small cell device comprises adjusting a broadcast power value associated with transmission power used by the small cell device to transmit data packets within the first group of 5G small cell devices. The first group of 5G small cell devices and the second group of 5G small cell devices are geographically proximate to each other. The first group of 5G small cell devices and the second group of 5G small cell device are geographically remote from each other.

Further acts can include initiating the receiving as a function of the quality of service value exceeding a defined threshold value representing a maximum value associated with a quality of service as determined on the small cell device; and initiating the receiving, by the device, as a function of the quality of service value being less than a defined threshold value representing a minimum value associated with a quality of service as determined on the small cell device.

Further, when the device is a first device, the first device is external to a hybrid fiber coaxial infrastructure; and the first device interfaces with a second device internal to the hybrid fiber coaxial infrastructure, and the second device executes a mobile edge computing process.

In accordance with still further embodiments, the subject disclosure describes a machine readable storage medium, a computer readable storage device, or non-transitory machine readable media comprising instructions that, in response to execution, cause a computing system comprising at least one processor to perform operations. The operations can include: receiving first data representing a quality of service value associated with a small cell device of a first group of small cell devices for which first communications adhere to at least one 5G wireless communications protocol; retrieving second data representing a historical quality of service value associated with a second group of small cell devices for which second communications adhere to the at least one 5G wireless communications protocol; as a function of the first data and the second data, generating a change value for the small cell device; and based on the change value, facilitating an adjustment in an operation of the small cell device.

In accordance with the foregoing, the processor can be included in a device situated within a hybrid fiber coaxial infrastructure that comprises the first group of small cell devices. Further, when the device is a first device, the first device can be in communication with a second device that is situated within a long term evolution packet core infrastructure.

Now with reference to the Figures, FIG. 1 illustrates a system 100 that provides surveillance of hybrid fiber coaxial (HFC) 5G Long Term Evolution small cell devices using mobile edge computing techniques hosted on a HFC device, in accordance with various embodiments. System 100 can comprise core/edge device 102 that can be in operable communication (e.g., wireless and/or wired communication) with a 5G small cell grouping 104 (collection of 5G small cell devices 104) and monitor device 106. Core/edge device 102 can be a device that is situated, in accordance with various embodiments, within a HFC infrastructure/environment. Core/edge device 102, in accordance with additional and/or alternative embodiments, can also be located external to, and interfacing with, a HFC infrastructure/environment. Nevertheless, for purposes of clarity of exposition, core/edge device 102 in this instance is described as being located within a HFC infrastructure/environment.

Core/edge device 102, in accordance with various embodiments, can execute one or more mobile edge computing processes to collect quality of service (QoS) data/metrics in regard to the collection of 5G small cell devices 104. The QoS data/metrics can comprise packet loss data, bit rate data, throughput data, transmission delay data, availability data, data relating to deviations from a time periodicity from a periodic signal determined in relation to a reference clock signal (e.g., jitter data), service response time data, signal-to-noise ratio (SNR) data, crosstalk data, echo data, interrupt data, frequency response data, loudness level data, and the like. The QoS data/metrics can be collected, by core/edge device 102, for each small cell device that can comprise the collection of 5G small cell devices 104.

In accordance with various embodiments, core/edge device 102, at defined and/or definable time intervals, can facilitate each of the small cell devices that comprise the collection of 5G small cell devices 104 to respond to a directive issued by core/edge device 102 to the small cell device to respond with their respective QoS data/metrics. In an additional and/or alternative embodiments, core/edge device 102 can passively wait for each small cell device comprising the collection of 5G small cell devices 104 to periodically (e.g., at randomly determined time intervals) send their respective QoS data/metrics. In accordance with further embodiments, the periodicity with which each small cell device comprising the collection of 5G small cell devices 104 can dispatch its QoS data/metrics can be determined as deviation (upward or downward) from a defined or definable threshold value associated with each QoS metric (or a combination of QoS metric). Thus for example, a small cell device of the collection of 5G small cell devices 104 can transmit to core/edge device 102 QoS data/metrics when the small cell device determines that a value associated with packet loss data has exceeded a threshold value associated with packet loss—can be indicative that the small cell device is approaching a state of distress and/or that the underlying network that forms the collection of 5G small cell devices 104 is congested. Similarly, a small cell device of the collection of 5G small cell devices 104 can transmit its QoS data/metrics when the small cell device determines that a value associated with interrupt data has fallen below a threshold value associated with interrupt data—can be indicative that the transmission of the QoS data/metrics will not be a major hindrance to the network that can underpin the collection of 5G small cell devices 104.

In further additional and/or alternative embodiments, core/edge device 102 (and/or the one or more mobile edge computing services operating/executing on core/edge device 102) based on, as a function of, or in response to QoS metric data that can have been received from one or more of the small cell devices that can comprise the collection of 5G small cell devices 104 can respectively (or collectively)

direct each small device to return their QoS data/metrics to core/edge device 102. In accordance with this aspect, core/edge device 102 can use one or more of machine learning techniques, artificial intelligence processes, neural network technologies, and the like to perform a cost/benefit analysis in regard to whether or not it is beneficial (or practicable) to cause the one or more small cell devices comprising the collection of 5G small cell devices 104 to return their respective QoS data/metrics at a particular instance of time.

Core/edge device 102, in response to receiving QoS data/metrics from the various small cell devices associated with the collection of 5G small cell devices 104, can collate/order/rank the QoS data/metrics, based for example, on a selection of the small cell devices. In accordance with embodiments, the ordering/ranking of the QoS data/metrics can be performed as a function, for example, of SNR data that can have been included by each of the small cell devices. In accordance with additional and/or alternative embodiments, the ordering/ranking can be performed based on two or more QoS data/metrics, for instance, jitter data and service response time data that can have been received from each of the small cell devices that can comprise the collection of 5G small cell devices 104.

Further, core/edge device 102 can also facilitate a small cell device included in the collection of 5G small cell devices 104 to adjust one or more of its broadcast characteristics based on the QoS data that the small cell device can have fed back to core/edge device 102. For example, in accord with various embodiments core/edge device 102, based at least on first QoS data/metrics sent by a first small cell device included in the collection of 5G small cell devices 104, can cause the first small cell device to adjust its broadcast power level. Additionally and/alternatively, core/edge device 102, in response to respective QoS data/metrics received from a second small cell device and a third small cell device, can respectively cause the second small cell device to adjust its broadcast power level, and can cause the third small cell device to adjust one or more of its associated antennae azimuths. In this manner core/edge device 102 can allow multiple small cell devices to coexist within the collective of 5G small cell devices 104 without unnecessary contention between each of the 5G small cell devices, which in turn can lead to greater small cell densities and/or small cell granularities within confined areas, a greater number of IoT end user devices being able to be operational and/or supported by the collection of 5G small cell devices 104, etc.

Core/edge device 102 can be any type of mechanism, machine, device, facility, and/or instrument that includes a processor and/or is capable of effective and/or operative communication with a network topology. Mechanisms, machines, devices, facilities, and/or instruments that can comprise core/edge device 102 can include tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for instance, orbiting satellites and/or associated aeronautical vehicles, and the like.

5G small cell grouping 104 can comprise a grouping of small cell devices, such as access point devices, base station devices, eNodeB devices, femtocell devices, picocell devices, microcell devices, and the like. Generally, small cell devices are low power, short range wireless transmission devices covering small indoor/outdoor geographic areas. Small cell devices can, for example, have transmission coverage areas that are less than 10 meters (m) to in excess of 2.5 kilometers (KM). Further, small cell devices can have broadcast power ratings of less than 100 milliwatts (mW) to over 5 watts (W), and can support over 200 simultaneous users. Thus, small cell devices can have all the functionalities and/or facilities of conventional base station devices, and further can be capable of handling high data rates for individual users.

In 5G deployments, small cell devices can provide efficient delivery of high speed mobile broadband and other low latency applications. Under the 5G paradigm, small cell devices can be designed to provide high speed mobile broadband connections that can exceed a few gigabytes per second rate; and can provide an ultra robust, reliable, low latency smart network (e.g., less than a millisecond latency) suitable for mission critical applications. Additionally, since the Internet of Things (IoT) can comprise a significant number of devices (e.g., in the hundreds of millions or billions), such as smart sensor devices (e.g., smart thermostats, smart home security devices, proximity devices, healthcare monitors, . . . ), the need for the functionalities, capabilities, and/or facilities provided by small cell devices to handle such massive data interchange between IoT devices can be overwhelmingly indubitable, and further illustrates that there currently is an unmet need for ongoing and continuous small cell device maintenance, monitoring, and/or management in order to effectively and efficiently had such data flows.

As noted earlier, 5G small cell grouping 104 can comprise a collection of small cell devices (e.g., access point devices, base station devices, eNodeB devices, femtocell devices, picocell devices, microcell devices, . . . ). Each of the small cell device included in 5G small cell grouping 104 can be one or more type of mechanism, machine, device, facility, and/or instrumentality that includes a processor and/or is capable of effective and/or operative communication with a network topology. Mechanisms, machines, devices, facilities, and/or instrumentalities that can comprise a small cell device can include handheld devices, tablet computing devices, server class computing machines and/or databases, laptop computers, notebook computers, desktop computers, cell phones, smart phones, consumer appliances and/or instrumentation, commercial appliances and/or instrumentation, industrial devices and/or components, personal digital assistants, multimedia Internet enabled phones, multimedia Internet enabled devices, multimedia players, aeronautical/avionic devices associated with, for example, orbiting satellites and/or associated aeronautical vehicles, and the like.

Also illustrated in FIG. 1 is monitor device 106 that can be in operative (e.g., wired and/or wireless) communication with core/edge device 102. In accordance with various embodiments, monitor device 106 can be situated within the wider core infrastructure of a mobile network operator (MNO) carrier. For example, monitor device 106 can be located at the core of the MNO infrastructure (e.g., a core device). Additionally and/or alternatively, monitor device 106 can be situated at an edge of the MNO infrastructure (e.g., an edge device). Further, in accordance with embodiments, monitor device 106 can be positioned externally to the HFC infrastructure within which core/edge device 102 can have been sited. Alternatively and/or additionally, monitor device 106 can be placed within the HFC infrastructure such that monitor device 106 interfaces with one or more devices of a grouping of devices associated with various implementations of the Long Term Evolution (LTE) paradigm such as: 3G LTE, 4G LTE, LTE Advanced, 5G, and the like. Illustrative devices of the grouping of devices can include core base station devices, edge base station devices, database server devices associated with the base station devices and/or edge base station devices, . . . .

Monitor device 106 can receive raw QoS data/metrics, via core/edge device 102 (e.g., wherein core/edge device 102 acts as a pass-through device) for each respective small cell device that can comprise collection of 5G small cell devices 104, and/or monitor device 106 can receive pre-processed QoS data/metrics from core/edge device 102 (e.g., wherein core/edge device 102 acts as a staging device and/or performs preliminary processing on the QoS data/metrics for each of the small cell device that can be included in the collection of 5G small cell devices 104 prior to forwarding the pre-processed QoS data/metrics to monitor device 106).

Monitor device 106, in response to received the QoS data/metrics (e.g., raw QoS data/metrics and/or pre-processed QoS data/metrics) can store the received QoS data/metrics to a database device of a group of database devices, and thereafter can perform processing on the received QoS data/metrics. Monitor device 106 can perform processing of the recently received QoS data/metrics in conjunction with additional QoS data/metrics that can have been stored to the database device in regard to each device (e.g., small cell devices and/or one or more devices associated with the IoT) included in the collection of 5G small cell devices 104, as well as QoS data/metrics that can have been received from additional disparate collections of 5G small cell devices that can be situated geographically proximate to the collection of 5G small cell device 104, and/or QoS data/metrics that can have been received from additional disparate collections of 5G small cell devices that can be positioned at geographically remote locations with respect to the collection of 5G small cell device 104.

Monitor device 106, based on the processing performed on the recently received QoS data/metrics, the additional QoS data/metrics that can have been stored to database devices of groupings of database devices in the context of each device (e.g., small cell devices and/or one or more devices associated with the IoT) included in the collection of 5G small cell devices 104, and/or the QoS data metrics that can have been received within a defined and/or definable period of time in regard to disparate and/or alternative geographically proximate (e.g., abutting, contiguous, adjoining, bordering, . . . ) and/or situationally distant (e.g., peripheral, remote, . . . ) collections of 5G small cell devices, can determine and/or generate one or more value that can be used by monitor device 106 to facilitate one or more adjustment in operation of one or more small cell device included in the collection of 5G small cell devices 104. Typically, the one or more values that facilitate adjustment operations on the one or more small cell devices included in the collection of 5G small cell devices 104 can be directed to the one or more small cell devices via mobile edge computing facilities and/or functionalities associated with core/edge device 102. Further, the one or more values determined and/or generated by monitor device 106 can relate to transmission or broadcast parameters associated with, for example, transmission/broadcast power, antenna settings, and the like. These adjustment operations that can be facilitated by monitor device 106, via core/edge device 102, can be necessitated because one or more of the small cell devices included in the collection of 5G small cell devices 104 is impinging upon a disparate abutting or adjacent collection of 5G small cell devices.

Figure 2:
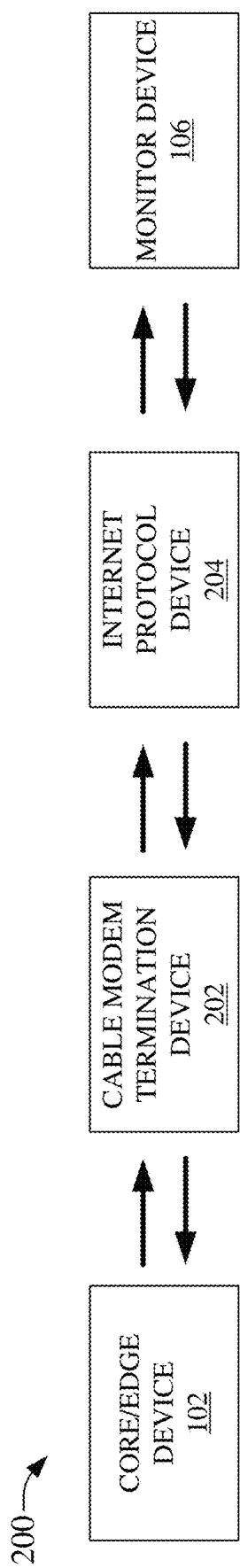
FIG. 2 is a further depiction of a system for the provision of surveillance of hybrid fiber coaxial (HFC) 5th generation (5G) Long Term Evolution (LTE) small cell devices using mobile edge computing techniques hosted by a HFC device, in accordance with aspects of the subject disclosure.

With reference to FIG. 2, illustrated therein is system 200 for providing surveillance of hybrid fiber coaxial (HFC) 5G Long Term Evolution small cell devices using mobile edge computing techniques hosted on a HFC device, in accordance with one or more embodiments. System 200 can include core/edge device 102 and monitor device 106. As has been noted earlier, core/edge device 102, in accordance with embodiments, can be positioned within a HFC infrastructure. Further, as also noted, core/edge device 102, in accordance with other embodiments, can be located external to, but nevertheless interfacing with, the HFC infrastructure. Nonetheless, for purposes of simplicity of description, core/edge device 102 can be situated within a HFC infrastructure environment.

Core/edge device 102, as depicted, can interface with and be in continuous and/or sporadic communication with monitor device 106 via cable modem termination device 202 and internet protocol device 204. While cable modem termination device 202 and internet protocol device 204 have been illustrated as being separate and distinct apparatuses, the facilities and/or functionalities associated with cable modem termination device 202 and internet protocol device 204 can be combined into a single unit in order to provide an effective communication conduit between core/edge device 102 and monitor device 106, wherein monitor device 106 can be located within a wider core infrastructure such as a MNO carrier network topology.

In accordance with various aspects, cable modem termination device 202 can be a head end (e.g., at a master facility for receiving broadcast television signals for processing and distribution over a cable television system infrastructure) cable modem termination system (CMTS) device that can used to provide high speed data services, such as cable internet and/or voice over internet protocol (VOIP) etc., to cable subscribers. Further, internet protocol device 204 can be a networking device that forwards data packets between disparate computer networks. Internet protocol device 204 can perform the traffic directing functions between the HFC infrastructure and the wider core network infrastructure associated with the MNO carrier. Without limitation or loss of generality and for purposes of this disclosure, core/edge device 102, cable modem termination device 202, and/or internet protocol device 204 can be co-located, though not necessarily in proximity with one another, within a HFC infrastructure.

Figure 3:
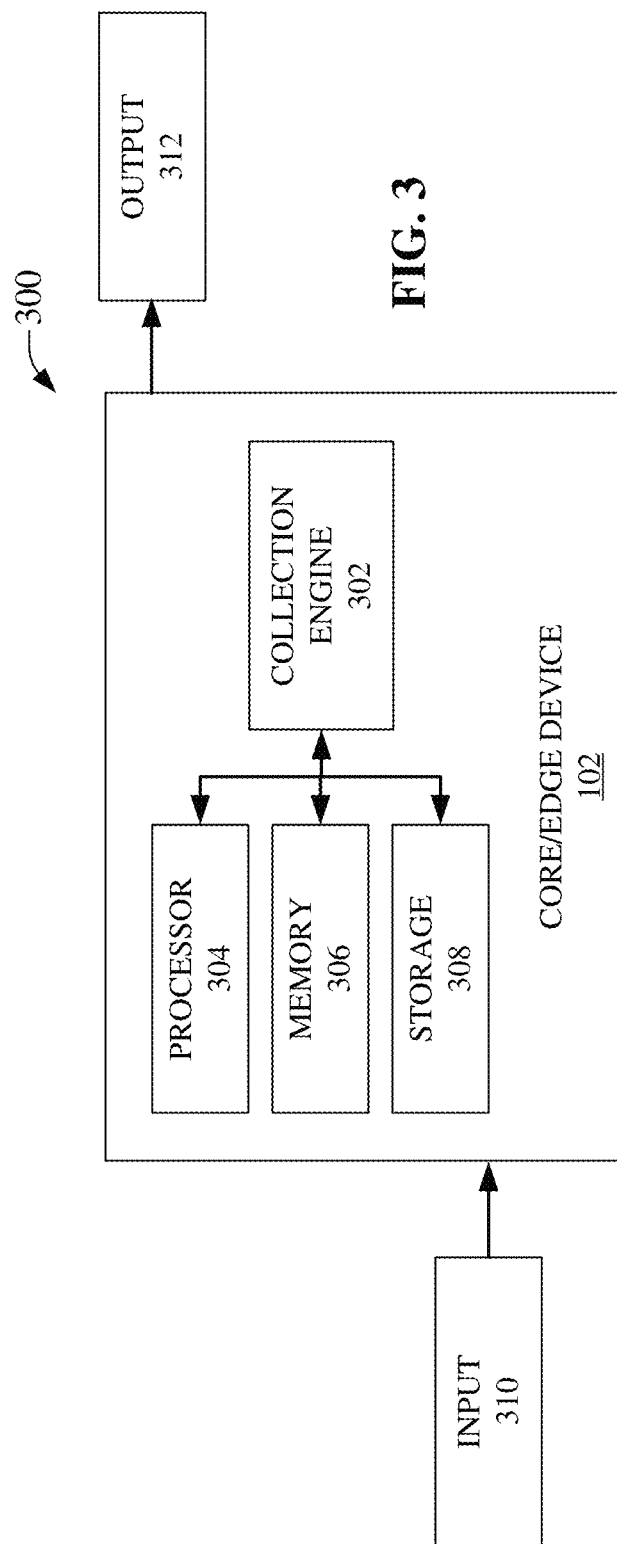
FIG. 3 provides illustration of an additional system for the provision of surveillance of hybrid fiber coaxial (HFC) 5th generation (5G) Long Term Evolution (LTE) small cell devices using mobile edge computing techniques hosted by a HFC device, in accordance with aspects of the subject disclosure.

FIG. 3 provides illustration of core/edge device 102, now referred to as system 300, for providing surveillance of hybrid fiber coaxial (HFC) 5G Long Term Evolution small cell devices using mobile edge computing techniques hosted on a HFC device, in accordance with one or more embodiments. System 300 can comprise collection engine 302 that can be communicatively coupled to processor 304, memory 306, and storage 308. Collection engine 302 can be in communication with processor 304 for facilitating operation of computer or machine executable instructions and/or components by collection engine 302, memory 306 for storing data and/or the computer or machine executable instructions and/or components, and storage 308 for providing longer term storage of data and/or machine and/or computer executable instructions. Additionally, system 300 can also receive input 310 for use, manipulation, and/or transformation by collection engine 302 to produce one or more useful, concrete, and tangible result and/or to transform one or more articles to different states or things. Further, system 300 can also generate and output the useful, concrete, and tangible result and/or the transformed one or more articles produced by collection engine 302 as output 312.

Collection engine 302 can execute one or more mobile edge computing processes to collect QoS data/metrics in regard to the collection of 5G small cell devices 104. As noted earlier, the QoS data/metrics can comprise packet loss data, bit rate data, throughput data, transmission delay data, availability data, data relating to time deviations from a time periodicity determined as a function of a periodic signal determined in relation to a reference clock signal (e.g., jitter data), service response time data, signal-to-noise ratio (SNR) data, crosstalk data, echo data, interrupt data, frequency response data, loudness level data, etc. The QoS data/metrics can be collected, by collection engine 302, for each small cell device that can be a member of the collection of 5G small cell devices 104.

In accordance with various embodiments, collection engine 302, at defined and/or definable time intervals, can facilitate each of the small cell devices comprising the collection of 5G small cell devices 104 to respond to a directive generated and issued, by collection engine 302, for each of the small cell devices in the collection of 5G small cell device 104 to respond with their respective QoS data/metrics.

In accordance with some embodiments, collection engine 302, rather than issuing a directive for each of the small cell devices to respond with QoS data/metric, can wait for each small cell device that comprises a collection of 5G small cell devices 104 to send their respective QoS data/metrics back to collection engine 302 for further processing and/or analysis. In one instance, the small cell devices included in the collection of 5G small cell devices 104 can send their QoS data/metrics at defined or definable periodic intervals. In other instances, the small cell devices included in the collection of 5G small cell device 104 can send their QoS data/metrics back to collection engine 302 based, for example, on deviations of one or more of the QoS data/metrics exceeding or falling below one or more disparate defined/tunable threshold values associated with each QoS datum/metric that can comprise the QoS data/metrics.

In further additional and/or alternative embodiments, collection engine 302 based on, as a function of, or in response to QoS metric data that can have been received from one or more of the small cell devices that can comprise the collection of 5G small cell devices 104, can respectively (or collectively) direct each small device to return their QoS data/metrics to core/edge device 102. In accordance with this aspect, collection engine 302 can use one or more of machine learning techniques, artificial intelligence processes, neural network technologies, and the like to perform a cost/benefit analysis in regard to whether or not it is beneficial (or practicable) to cause the one or more small cell devices comprising the collection of 5G small cell devices 104 to return their respective QoS data/metrics at a particular instance of time.

Collection engine 302, in response to receiving QoS data/metrics from the various small cell devices associated with the collection of 5G small cell devices 104, can collate/order/rank the QoS data/metrics, based for example, on a selection of the small cell devices. In accordance with embodiments, the ordering/ranking of the QoS data/metrics can be performed as a function, for example, of SNR data that can have been included by each of the small cell devices. In accordance with additional and/or alternative embodiments, the ordering/ranking can be performed based on two or more QoS data/metrics, for instance, jitter data and service response time data that can have been received from each of the small cell devices that can comprise the collection of 5G small cell devices 104.

Further, collection engine 302 can also facilitate a small cell device included in the collection of 5G small cell devices 104 to adjust one or more of its broadcast characteristics based on the QoS data that the small cell device can have fed back to collection engine 302. For example, in accord with various embodiments collection engine 302, based at least on first QoS data/metrics sent by a first small cell device included in the collection of 5G small cell devices 104, can cause the first small cell device to adjust its broadcast power level. Additionally and/alternatively, collection engine 302, in response to respective QoS data/metrics received from a second small cell device and a third small cell device, can respectively cause the second small cell device to adjust its broadcast power level, and can cause the third small cell device to adjust one or more of its associated antennae azimuths. In this manner collection engine 302 can allow multiple small cell devices to coexist within the collective of 5G small cell devices 104 without unnecessary contention between each of the 5G small cell devices, which in turn can lead to greater small cell densities and/or small cell granularities within confined areas, a greater number of IoT end user devices being able to be operational and/or supported by the collection of 5G small cell devices 104, etc.

Figure 4:
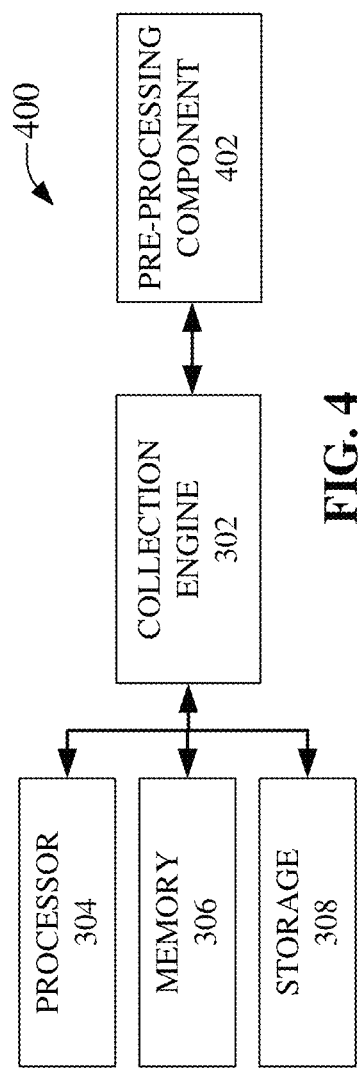
FIG. 4 provides another illustration of a system for the provision of surveillance of hybrid fiber coaxial (HFC) 5th generation (5G) Long Term Evolution (LTE) small cell devices using mobile edge computing techniques hosted by a HFC device, in accordance with aspects of the subject disclosure.

FIG. 4 provides additional depiction of core/edge device 102, now referred to as system 400, for providing surveillance of hybrid fiber coaxial (HFC) 5G Long Term Evolution small cell devices using mobile edge computing techniques hosted on a HFC device, in accordance with one or more embodiments. As illustrated core/edge device 102, in addition to comprising collection component 302 can also include pre-processing component 402. Pre-processing component 402 can operate in conjunction with collection engine 302, processor 304, memory 306, and storage 308 to perform a preliminary processing of the QoS that can have been received from the small cell devices that can comprise the collection of 5G small cell devices 104. Pre-processing component 402, through use of machine learning techniques, artificial intelligence processes, neural network technologies, and the like, can perform a cost/benefit analysis in regard to whether or not it is beneficial (or practicable) to cause the one or more small cell devices comprising the collection of 5G small cell devices 104 to return their respective QoS data/metrics at a particular instance of time.

Further, pre-processing component 402, can collate and impose an ordering or ranking on the QoS data/metrics, based for example, on a small selection of the small cell devices. The ordering/ranking of the QoS data/metrics can be performed as a function, for example, of SNR data that can have been included by each of the small cell devices. Additionally and/or alternatively, the ordering/ranking can be performed based on two or more QoS data/metrics, for instance, jitter data and service response time data that can have been received from each of the small cell devices that can comprise the collection of 5G small cell devices 104.

Further, pre-processing component 402, through the aegis of collection engine 302, processor 304, memory 306, and/or storage 308, can also facilitate a small cell device included in the collection of 5G small cell devices 104 to adjust one or more of its broadcast characteristics based on the QoS data that the small cell device can have fed back to collection engine 302. For example, in accord with various embodiments pre-processing component 402, based at least on first QoS data/metrics sent by a first small cell device included in the collection of 5G small cell devices 104, can cause the first small cell device to adjust its broadcast power level. Additionally and/alternatively, pre-processing component 402, in response to respective QoS data/metrics received from a second small cell device and a third small cell device, can respectively cause the second small cell device to adjust its broadcast power level, and can cause the third small cell device to adjust one or more of its associated antennae azimuths.

Figure 5:
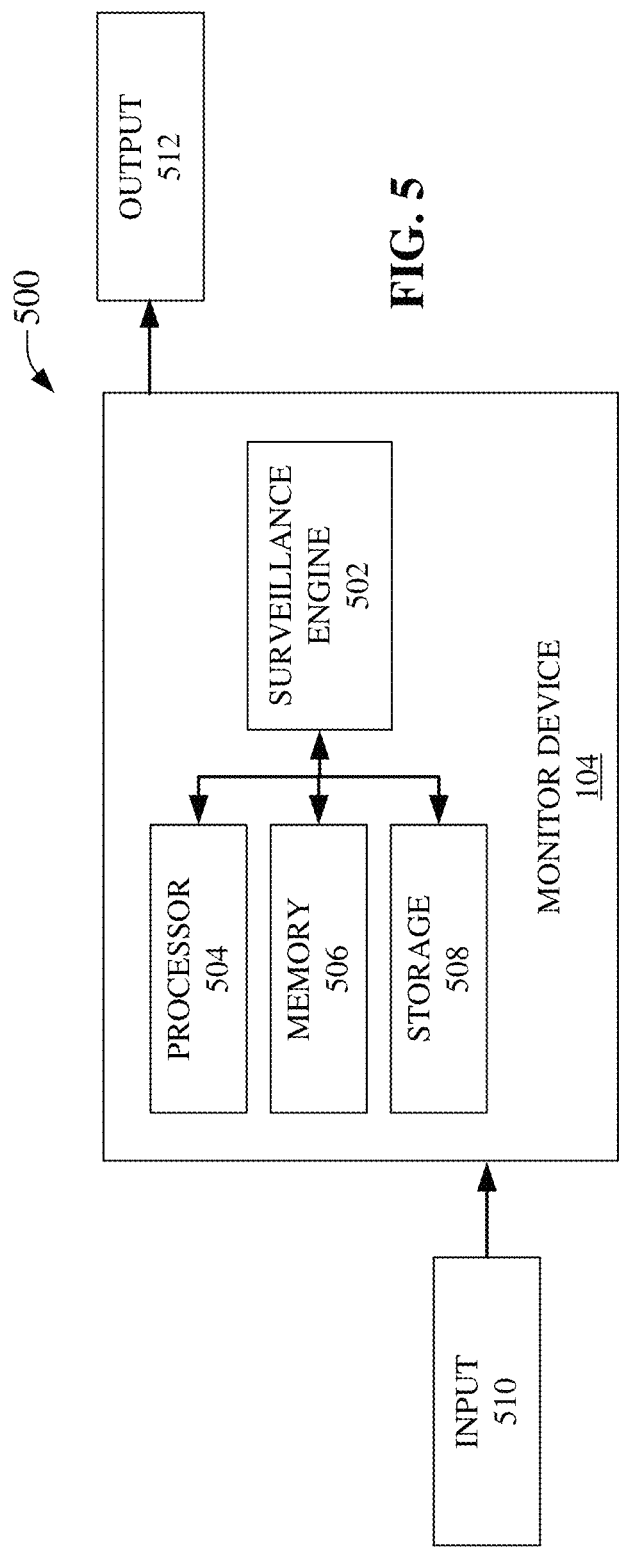
FIG. 5 provides another depiction of a system for the provision of surveillance of hybrid fiber coaxial (HFC) 5th generation (5G) Long Term Evolution (LTE) small cell devices using mobile edge computing techniques hosted by a HFC device, in accordance with aspects of the subject disclosure.

FIG. 5 provides further depiction of monitor device 104, now labeled as system 500, for providing surveillance of hybrid fiber coaxial (HFC) 5G Long Term Evolution small cell devices using mobile edge computing techniques hosted on a HFC device, in accordance with one or more embodiments. System 500 can include surveillance engine 502 that can be communicatively coupled to processor 504, memory 506, and storage 508. Surveillance engine 502 can be in communication with processor 504 for facilitating operation of computer or machine executable instructions and/or components by surveillance engine 502, memory 506 for storing data and/or the computer or machine executable instructions and/or components, and storage 508 for providing longer term storage of data and/or machine and/or computer executable instructions. Additionally, system 500 can also receive input 510 for use, manipulation, and/or transformation by surveillance engine 502 to produce one or more useful, concrete, and tangible result and/or transform one or more articles to different states or things. Further, system 500 can also generate and output the useful, concrete, and tangible result and/or the transformed one or more articles produced by surveillance engine 502 as output 512.

Surveillance engine 502 can receive, via input 510, raw QoS data/metrics, from core/edge device 102 for each respective small cell device that can comprise collection of 5G small cell devices 104. Additionally and/or alternatively, surveillance engine 502 can receive as input 510 pre-processed QoS data/metrics from core/edge device 102.

Surveillance engine 502 on receiving the QoS data/metrics (e.g., raw QoS data/metrics and/or pre-processed QoS data/metrics) can store the received QoS data/metrics to memory 506 and/or storage 508, as well as persist the received QoS data/metrics to a database device of a group of database devices. Surveillance engine 502 can thereafter perform processing on the received QoS data/metrics.

Surveillance engine 502 can perform processing of the recently received QoS data/metrics in conjunction with additional QoS data/metrics that can have been stored to memory 506 and/or storage 508, QoS data/metrics that can have been stored to the database device in regard to each device (e.g., small cell devices and/or one or more devices associated with the IoT) included in the collection of 5G small cell devices 104, as well as QoS data/metrics that can have been received from additional disparate collections of 5G small cell devices that can be situated geographically proximate to the collection of 5G small cell device 104, and/or QoS data/metrics that can have been received from additional disparate collections of 5G small cell devices that can be positioned at geographically remote locations with respect to the collection of 5G small cell device 104.

Surveillance engine 502, based on the processing performed on the recently received QoS data/metrics, the additional QoS data/metrics that can have been stored to database devices of groupings of database devices in the context of each device (e.g., small cell devices and/or one or more devices associated with the IoT) included in the collection of 5G small cell devices 104, and/or the QoS data metrics that can have been received within a defined and/or definable period of time in regard to disparate and/or alternative geographically proximate (e.g., abutting, contiguous, adjoining, bordering, . . . ) and/or positionally distant (e.g., peripheral, remote, . . . ) collections of 5G small cell devices, can determine and/or generate one or more value that can be used by system 500 to facilitate one or more adjustment in operation of one or more small cell device included in the collection of 5G small cell devices 104. Typically, the one or more values that facilitate adjustment operations on the one or more small cell devices included in the collection of 5G small cell devices 104 can be directed to the one or more small cell devices via mobile edge computing facilities and/or functionalities associated with core/edge device 102. Further, the one or more values determined and/or generated by surveillance engine 502 can relate to transmission or broadcast parameters associated with, for example, transmission/broadcast power, antenna settings, and the like. These adjustment operations that can be facilitated by surveillance engine 502, via core/edge device 102, can be necessitated because one or more of the small cell devices included in the collection of 5G small cell devices 104 is impinging upon a disparate abutting or adjacent collection of 5G small cell devices.

Figure 6:
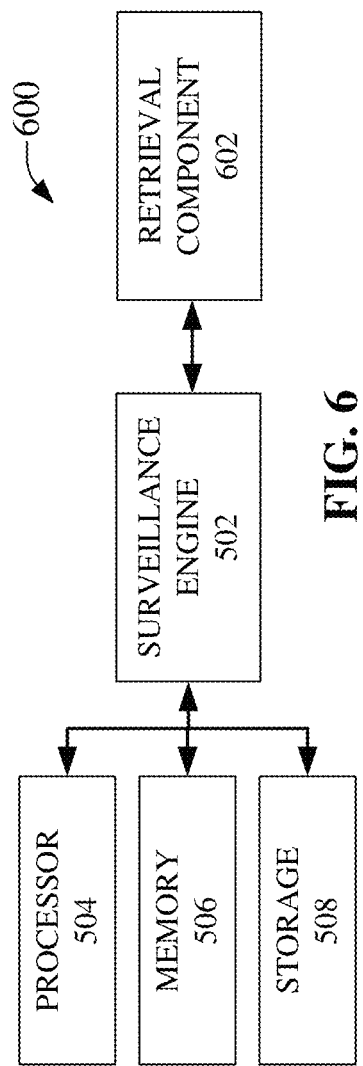
FIG. 6 provides further depiction of a system for the provision of surveillance of hybrid fiber coaxial (HFC) 5th generation (5G) Long Term Evolution (LTE) small cell devices using mobile edge computing techniques hosted by a HFC device, in accordance with aspects of the subject disclosure.

FIG. 6 provides additional depiction of monitor device 104, now labeled as system 600, for providing surveillance of hybrid fiber coaxial (HFC) 5G Long Term Evolution small cell devices using mobile edge computing techniques hosted on a HFC device, in accordance with one or more embodiments. As depicted monitor device 104 can comprise surveillance engine 502 that can operate in collaboration with retrieval component 602. Retrieval component 602 can receive raw QoS data/metrics, from core/edge device 102 for each respective small cell device that can comprise collection of 5G small cell devices 104. Retrieval component 602 can also receive as input 510 pre-processed QoS data/metrics from core/edge device 102. In response to receiving the raw QoS data/metrics and/or the pre-processed QoS data/metrics for core/edge device 102, retrieval component 602 can facilitate storage the received QoS data/metrics to memory 506 and/or storage 508, as well facilitating storage of the received QoS data/metrics to a database device of a group of database devices.

Figure 7:
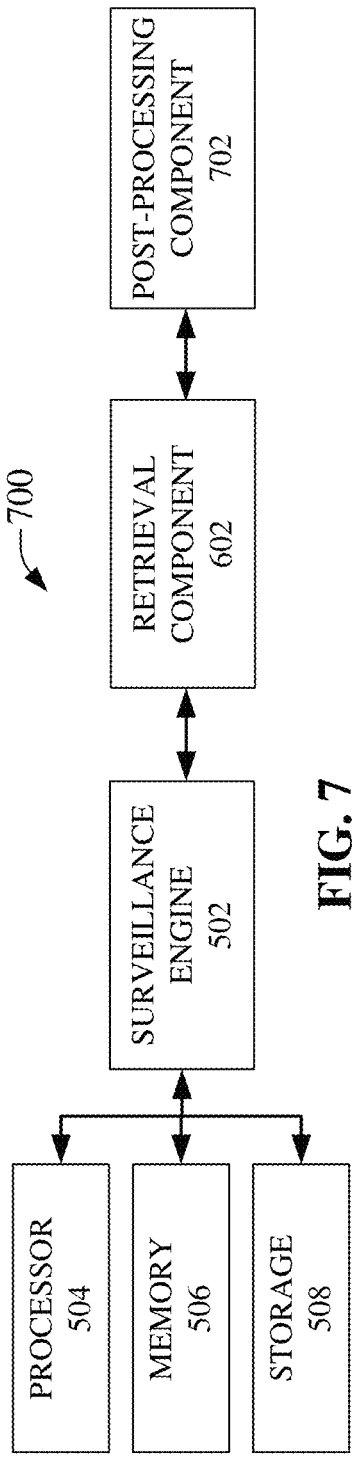
FIG. 7 provides additional illustration of a system for the provision of surveillance of hybrid fiber coaxial (HFC) 5th generation (5G) Long Term Evolution (LTE) small cell devices using mobile edge computing techniques hosted by a HFC device, in accordance with aspects of the subject disclosure.

FIG. 7 provides further illustration of monitor device 104, now labeled as system 700, for providing surveillance of hybrid fiber coaxial (HFC) 5G Long Term Evolution small cell devices using mobile edge computing techniques hosted on a HFC device, in accordance with one or more embodiments. As illustrated, system 700 can comprise surveillance engine 502 and retrieval component 602 that can operate in conjunction with post-processing component 702. Post-processing component 702 can perform processing of the recently received QoS data/metrics in conjunction with additional QoS data/metrics that can have been stored to memory 506 and/or storage 508, QoS data/metrics that can have been stored to the database device in regard to each device (e.g., small cell devices and/or one or more devices associated with the IoT) included in the collection of 5G small cell devices 104, as well as QoS data/metrics that can have been received from additional disparate collections of 5G small cell devices that can be situated geographically proximate to the collection of 5G small cell device 104, and/or QoS data/metrics that can have been received from additional disparate collections of 5G small cell devices that can be positioned at geographically remote locations with respect to the collection of 5G small cell device 104.

Post-processing component 702, based on the processing performed on the recently received QoS data/metrics, the additional QoS data/metrics that can have been stored to database devices of groupings of database devices in the context of each device included in the collection of 5G small cell devices 104, and/or the QoS data metrics that can have been received within a defined and/or definable period of time in regard to disparate and/or alternative geographically proximate and/or positionally distant collections of 5G small cell devices, can determine and/or generate one or more value that can be used by system 500 to facilitate one or more adjustment in operation of one or more small cell device included in the collection of 5G small cell devices 104. Typically, the one or more values that facilitate adjustment operations on the one or more small cell devices included in the collection of 5G small cell devices 104 can be directed to the one or more small cell devices via mobile edge computing facilities and/or functionalities associated with core/edge device 102. Further, the one or more values determined and/or generated by post-processing component 702 can relate to transmission or broadcast parameters associated with, for example, transmission/broadcast power, antenna settings, and the like. These adjustment operations that can be facilitated by post-processing component 702, via core/edge device 102, can be necessitated because one or more of the small cell devices included in the collection of 5G small cell devices 104 is impinging upon a disparate abutting or adjacent collection of 5G small cell devices.

Figure 8:
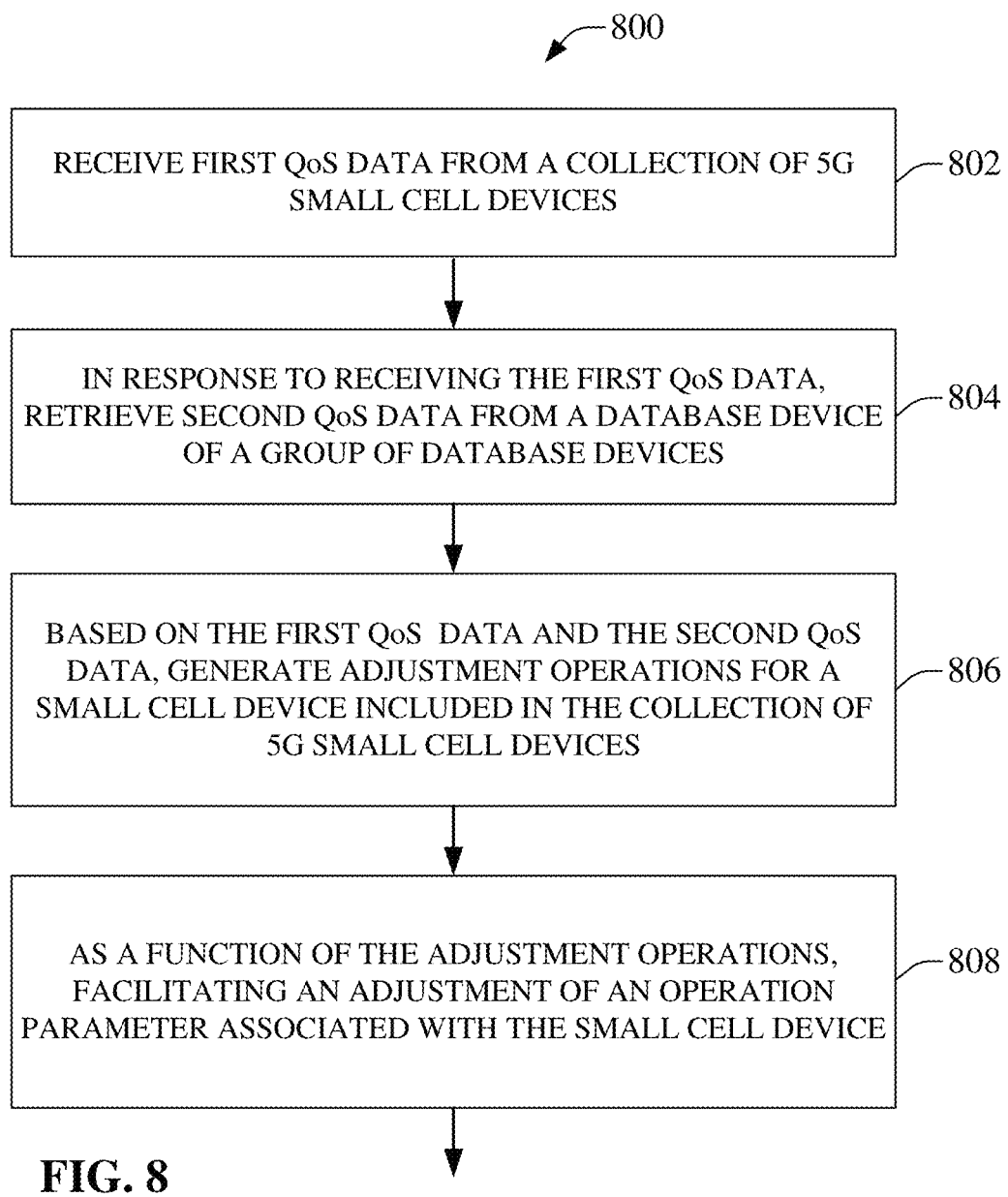
FIG. 8 provides illustration of a flow chart or method for the provision of surveillance of hybrid fiber coaxial (HFC) 5th generation (5G) Long Term Evolution (LTE) small cell devices using mobile edge computing techniques hosted by a HFC device, in accordance with described embodiments of the subject disclosure.

In view of the example system(s) described above, example method(s) that can be implemented in accordance with the disclosed subject matter can be better appreciated with reference to the flowcharts in FIG. 8. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 8 illustrates a method 800 for countering SIM swapping fraud attacks. Method 800 can commence at act 802 wherein system 500 can receive QoS data/metrics (e.g., first QoS data/metrics) from a collection of 5G small cell devices (e.g., collection of 5G small cell device 104). At act 804 system 500, in response to receiving the first QoS data/metrics, can retrieve second QoS data/metrics from a database device of a group of database devices. The second QoS data/metrics can relate to QoS data/metrics that can have been obtained from similar collections of 5G small cell devices. At act 806 system 500, based on the first QoS data/metrics and the second QoS data/metrics, can generate adjustment operations for a small cell device included in the collection of 5G small cell devices. At act 808 system 500, as a function of the adjustment operations, can facilitate an adjustment of an operation parameter associated with the small cell device.

It should be realized and appreciated by those of ordinary skill, the foregoing non-limiting example use application(s) are merely illustrations of a use to which the disclosed and described solution can be applied and thus are provided solely for the purposes of exposition. The described and disclosed subject matter is therefore not limited to the foregoing example application(s), but can find applicability in other more generalized circumstances and use applications.

Figure 9:
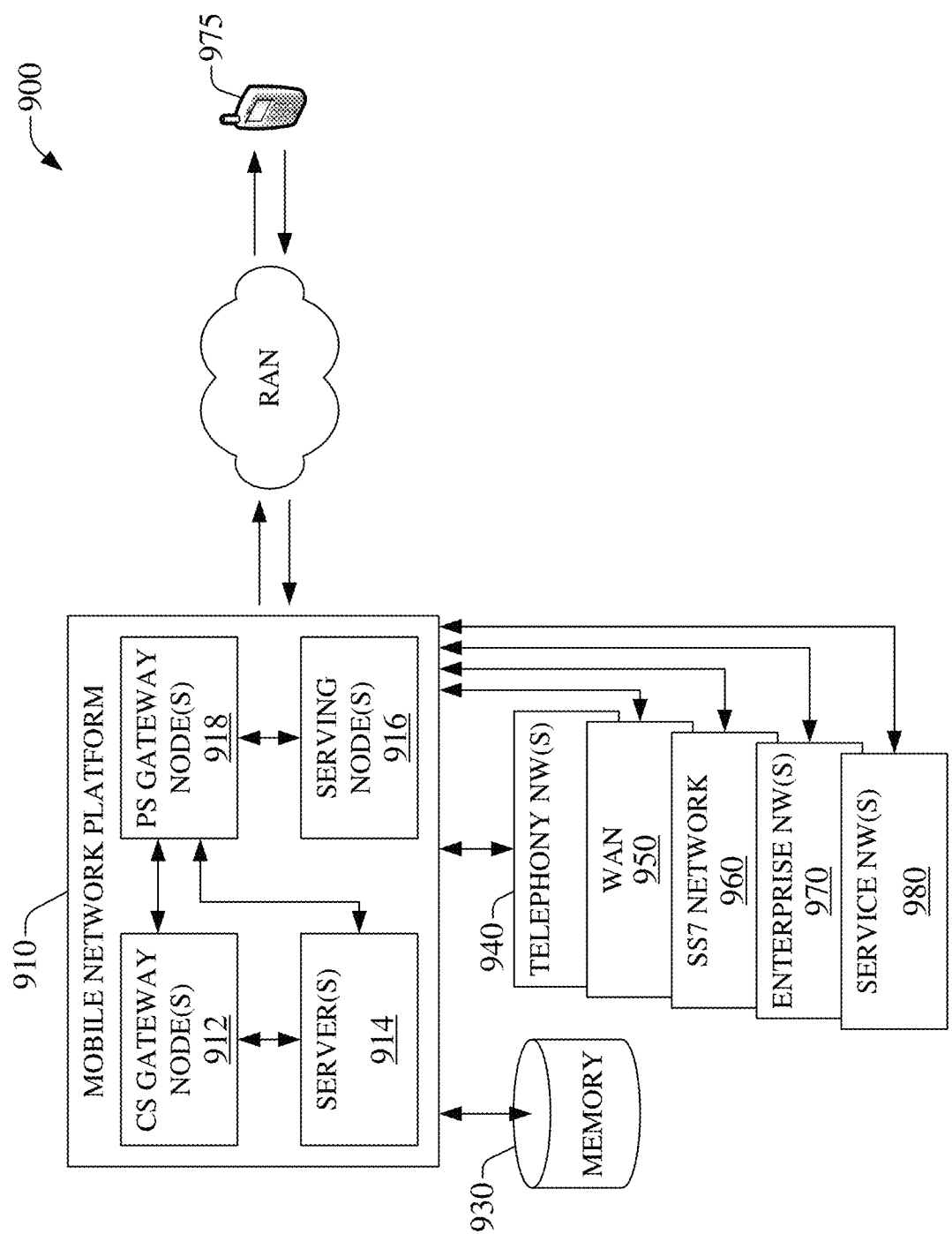
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
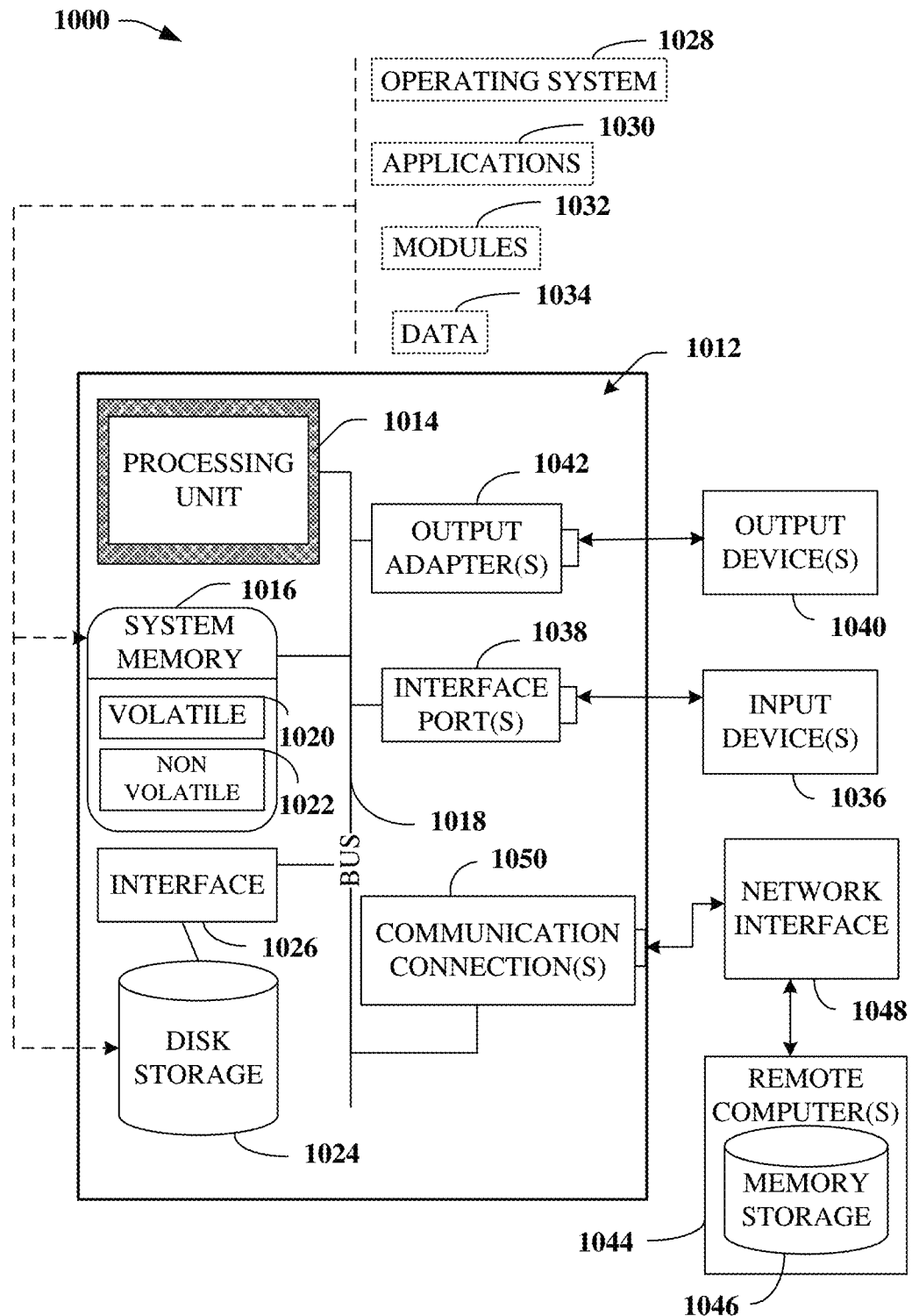
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
      retrieving data representing a quality of service value associated with a small cell device of a group of small cell devices configured according to a 5G wireless communication protocol; and
      as a function of the quality of service value and a ranking of the quality of service value relative to a group of quality of service values received from the group of small cell devices, facilitating adjusting an operating parameter associated with the small cell device.

2. The device of claim 1, wherein the device is located in a hybrid fiber coaxial infrastructure environment.

3. The device of claim 1, wherein the device executes a mobile edge computing process.

4. The device of claim 1, wherein the device is a first device and wherein the first device interfaces with a second device located in a 5G long term evolution network.

5. The device of claim 4, wherein the operations further comprise sending the quality of service value to the second device.

6. The device of claim 5, wherein the operations further comprise receiving the operation parameter from the second device.

7. The device of claim 1, wherein the operation parameter facilitates a reduction of a transmission power level associated with the small cell device.

8. The device of claim 1, wherein the operation parameter facilitates a change in azimuth associated with an antenna associated with the small cell device.

9. A method, comprising:
   receiving, by a device comprising a processor, first data representing a quality of service value associated with a small cell device of a first group of 5G small cell devices;
   retrieving, by the device, second data representing a historical quality of service value associated with a second group of 5G small cell devices;
   as a function of the first data, the second data, and ranking data representative of an ordering of the quality of service value in relation to a group of quality of service values received from the first group of 5G small cell devices, generating, by the device, a operation change parameter value for the small cell device; and based on the operation change parameter value, facilitating, by the device, a change in an operation of the small cell device.

10. The method of claim 9, wherein the change in the operation of the small cell device comprises adjusting an azimuth value associated with an antenna of the small cell device.

11. The method of claim 9, wherein the change in operation of the small cell device comprising adjusting a broadcast power value associated with transmission power used by the small cell device to transmit data packets within the first group of 5G small cell devices.

12. The method of claim 9, wherein the first group of 5G small cell devices and the second group of 5G small cell devices are geographically proximate to each other.

13. The method of claim 9, wherein the first group of 5G small cell devices and the second group of 5G small cell device are geographically remote from each other.

14. The method of claim 9, wherein the receiving, by the device, is initiated by the small cell device as a function of the quality of service value exceeding a defined threshold value representing a maximum value associated with a quality of service.

15. The method of claim 9, wherein the receiving is initiated by the small cell device as a function of the quality of service value being less than a defined threshold value representing a minimum value associated with a quality of service.

16. The method of claim 9, wherein the device is a first device, and where the first device is external to a hybrid fiber coaxial infrastructure.

17. The method of claim 16, wherein the first device interfaces with a second device within the hybrid fiber coaxial infrastructure, and wherein the second device executes a mobile edge computing process.

18. A non-transitory machine-readable medium, comprising executable instructions that, when executed by a processor, facilitate performance of operations, comprising:
receiving first data representing a quality of service value associated with a small cell device of a first group of small cell devices for which first communications adhere to at least one 5G wireless communications protocol;
retrieving second data representing a historical quality of service value associated with a second group of small cell devices for which second communications adhere to the at least one 5G wireless communications protocol;
as a function of the first data, the second data, and data representative of an ordering of the quality of service value in relation to a group of quality of service values received from the first group of small cell devices, generating a change value for the small cell device; and
based on the change value, facilitating an adjustment in an operation of the small cell device.

19. The non-transitory machine-readable medium of claim 18, wherein the processor is included in a device situated within a hybrid fiber coaxial infrastructure that comprises the first group of small cell devices.

20. The non-transitory machine-readable medium of claim 19, wherein the device is a first device, and wherein the first device is in communication with a second device that is situated within a long term evolution packet core infrastructure.

\* \* \* \* \*